(12) United States Patent
Hutchinson et al.

(10) Patent No.: US 7,689,196 B2
(45) Date of Patent: Mar. 30, 2010

(54) TIMER-BASED SLEEP FOR TERMINALS IN WIRELESS COMMUNICATION SYSTEMS

(75) Inventors: James A. Hutchinson, San Diego, CA (US); Simon Turner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 690 days.

(21) Appl. No.: 10/351,126

(22) Filed: Jan. 24, 2003

(65) Prior Publication Data
US 2004/0198302 A1    Oct. 7, 2004

Related U.S. Application Data

(60) Provisional application No. 60/391,938, filed on Jun. 26, 2002.

(51) Int. Cl.
*G06F 15/16* (2006.01)
(52) U.S. Cl. .................... 455/343.1; 455/574
(58) Field of Classification Search .............. 455/343.1, 455/343.2, 343.4, 343.5, 574; 370/311; 340/7.32–7.38
See application file for complete search history.

(56) References Cited

U.S. PATENT DOCUMENTS

| | | | | |
|---|---|---|---|---|
| 4,449,248 | A * | 5/1984 | Leslie et al. | 340/7.36 |
| 4,860,005 | A * | 8/1989 | DeLuca et al. | 455/343.1 |
| 5,128,938 | A * | 7/1992 | Borras | 370/311 |
| 5,574,996 | A | 11/1996 | Raith | 455/161.3 |
| 5,790,946 | A * | 8/1998 | Rotzoll | 455/343.1 |
| 6,195,573 | B1 * | 2/2001 | Cassidy et al. | 455/574 |
| 6,289,227 | B1 | 9/2001 | Shi | 455/574 |
| 6,363,267 | B1 * | 3/2002 | Lindskog et al. | 455/574 |
| 6,453,182 | B1 | 9/2002 | Sprigg et al. | |

(Continued)

FOREIGN PATENT DOCUMENTS

EP    0711089    5/1996

(Continued)

OTHER PUBLICATIONS

3GPP2C.S0024 ver. 4.0, "CDMA2000 High Rate Packet Data Air Interface Specification." IS 856, Oct. 25, 2002, pp. 1-548.

(Continued)

*Primary Examiner*—Sam Bhattacharya
(74) *Attorney, Agent, or Firm*—Howard H. Seo; Darren M. Simon

(57) ABSTRACT

Techniques for performing timer-based sleep to extend sleep time and thus battery life for a terminal in a wireless communication system. The likelihood of data traffic may be related to recent usage. If recent usage indicates that data traffic is unlikely, then the terminal can continue to maintain the link but monitor the signals from the system at a reduced rate. In one method, the probability of data traffic for the terminal is initially estimated (e.g., based on time since last activity and a particular usage model). A timer value is then determined based on the estimated probability of data traffic. The timer value may be modified based on an event, which may relate to link maintenance, hand-off, and so on. Sleep is then performed for the duration corresponding to the unmodified or modified timer value and may extend past one or more designated paging slots.

29 Claims, 7 Drawing Sheets

U.S. PATENT DOCUMENTS

| | | | |
|---|---|---|---|
| 6,480,476 B1 * | 11/2002 | Willars | 370/311 |
| 6,823,191 B2 * | 11/2004 | Laroia et al. | 455/343.1 |
| 6,937,861 B2 * | 8/2005 | Vanghi | 455/436 |
| 2002/0110085 A1 * | 8/2002 | Ho et al. | 370/230 |
| 2003/0210668 A1 * | 11/2003 | Malladi et al. | 370/335 |

FOREIGN PATENT DOCUMENTS

| | | |
|---|---|---|
| EP | 0711089 A2 | 5/1996 |
| WO | 0022837 | 4/2000 |
| WO | 00022837 | 4/2000 |
| WO | 0160103 A1 | 8/2001 |
| WO | 01060103 | 8/2001 |

OTHER PUBLICATIONS

International Search Report - PCT/US03/20402, International Search Authority - European Patent Office - Oct. 15, 2003.

International Preliminary Examination Report, PCT/US03/20402 - IPEA/US- Alexandria, Virginia - Sep. 25, 2004.

* cited by examiner

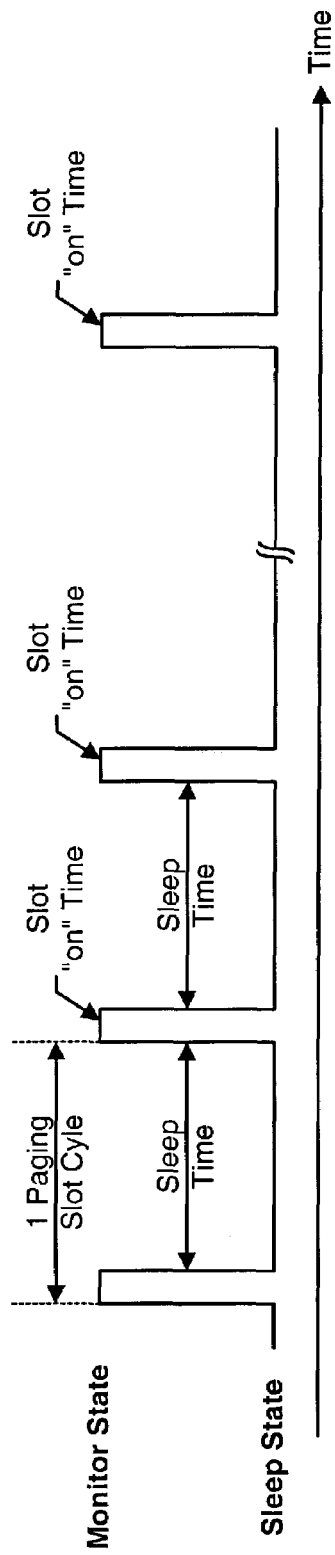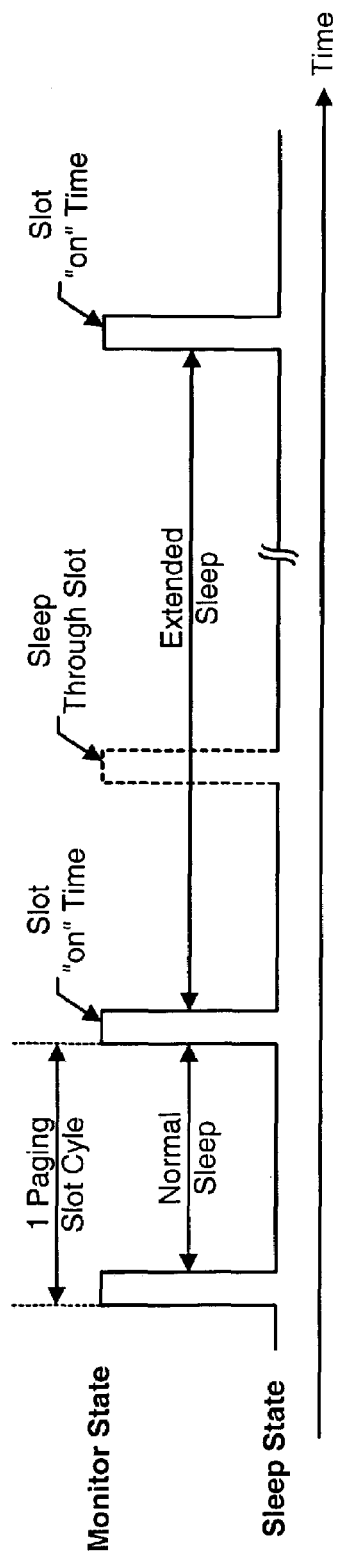

TIMER-BASED SLEEP FOR TERMINALS IN WIRELESS COMMUNICATION SYSTEMS

This application claims the benefit of provisional U.S. Application Ser. No. 60/391,938, entitled "Timer-Based Sleep Time System for 1xEV-DO," filed Jun. 26, 2002, which is incorporated herein by reference in its entirety for all purposes.

BACKGROUND

I. Field

The present invention relates generally to data communication, and more specifically to techniques for performing timer-based sleep by terminals in wireless communication systems.

II. Background

A terminal in a typical wireless communication system may only be active sporadically. For example, for packet data application, the terminal may transmit and/or receive data in short bursts and may remain in an "idle" state for significant periods of time between these data bursts However, to ensure that pertinent information can still be received by the terminal even while it is in the idle state, the terminal periodically monitors signals from the system for certain messages. These messages may include those for updating system overhead information, those for alerting the terminal to pertinent events (e.g., a hand-off), and so on.

While the terminal is in the idle state, it continues to consume power to sustain circuitry necessary to monitor the signals from the system. The terminal may be Ma portable unit (e.g., a handset) that is powered by an internal battery. In this case, power consumption by the terminal while it is in the idle state decreases the available battery resources. This would then shorten both the "standby" time between battery recharges and the "on" time for active communication. For a portable terminal, it is highly desirable to minimize power consumption in the idle state and thereby extend battery life.

In one conventional technique for reducing power consumption by a terminal in the idle state, the terminal enters a "slotted sleep" mode whereby it periodically transitions between a "sleep" state and a "monitor" state. In the sleep state, the terminal powers down as much circuitry as possible to conserve power. In the monitor state, the terminal can receive messages on an overhead channel. The overhead channel may be partitioned into numbered "paging slots" and the terminal may be assigned or designated with specific paging slots. The terminal would then enter the sleep state between successive designated paging slots, wake up prior to the next designated paging slot, monitor the overhead channel for messages, and revert to the sleep state if additional processing or communication is not required. In the time period between successive designated paging slots, the terminal is in the sleep state and the system does not send any messages specifically for the terminal. The system continues to send system overhead information, but the terminal is not required to monitor this information unless it is needed. Messages directed to this specific terminal are sent during the designated page slots for the terminal.

Conventionally, the terminal enters the slotted sleep mode if it does not have an active session with the system. While in this mode, the terminal would wake up periodically to receive messages on its designated paging slots. For some systems (e.g., CDMA systems that implement IS-2000 and IS-95), the designated paging slots for the terminal are configurable and may be negotiated between the terminal and the system. For these systems, the sleep time may be extended by assigning the terminal with paging slots that are spaced further apart in time.

However, some wireless communication systems transmit messages in designated paging slots at relatively short fixed intervals (i.e., not configurable between the terminal and the system, and relatively frequent). For example, a CDMA system that implements IS-856 (which is also referred to as an HDR system) transmits messages in paging slots that are spaced apart by 5.12 seconds. For a terminal in the idle state in such a system, the standby time for the terminal may be shortened considerably if it has to wake up at each designated paging slot. If the designated paging slots for the terminal are not configurable, then some other mechanism is needed in order to extend the sleep time for the terminal so that battery power can be conserved and standby time can be extended.

A terminal may concurrently operate on two or more systems (e.g., IS-856 and IS-2000 or IS-95) by arranging for the page slots assigned by these systems to be interleaved in a manner such that the terminal is able to process information from each system. Operating on multiple systems extends the capability of the terminal. However, for a terminal required to wake up for every designated page slot on both systems, the standby time for the terminal may shortened considerably.

There is therefore a need in the art for techniques to extend sleep time for terminals in wireless communication systems, such as those with fixed paging slots.

SUMMARY

Techniques are provided herein for performing timer-based sleep to extend sleep-time and thus battery life for terminals in wireless communication systems. It is recognized that the likelihood of data traffic (i.e., transmission and/or reception of data) for a terminal may be related to recent usage. Thus, if the recent usage indicates that data traffic is unlikely, then the terminal can continue to maintain the link but can monitor the signals from the system at a reduced rate.

In one specific embodiment, a method is provided for performing sleep for a terminal in a wireless communication system. This system may be a CDMA system that sends messages for the terminal in designated paging slots at fixed intervals while the terminal is in an idle state. In accordance with the method, the probability of data traffic for the terminal is initially estimated (e.g., based on the time since last activity by the terminal and a particular usage model). A timer value is then determined based on the estimated probability of data traffic. This may be achieved, for example, by (1) mapping the estimated probability of data traffic to one of a number of probability threshold values, and (2) identifying the timer value as the one associated with the mapped probability threshold value. The timer value may be modified based on an event, which may relate to link maintenance, hand-off, and so on, as described below. Sleep is then performed for a duration of time corresponding to the timer value (which may have been modified for the event). The duration of the sleep may extend past one or more designated paging slots.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 3A and 3B show timing diagrams for operation in a Monitor state and a Sleep state by the terminal without and with extended timer-based sleep, respectively;

DETAILED DESCRIPTION

The techniques described herein for performing timer-based sleep may be used in various wireless communication systems. These systems may be multiple-access systems capable of supporting communication with multiple users by sharing the available system resources. Examples of such multiple-access systems include code division multiple access (CDMA) systems, time division multiple access (TDMA) systems, and frequency division multiple access (FDMA) systems. A CDMA system may be designed to implement one or more standards such as IS-2000, W-CDMA, IS-856, and IS-95, all of which are known in the art. For clarity, these techniques are specifically described below for a CDMA system that implements IS-856, which is also referred to as a High Data Rate (HDR) system or a CDMA 1xEV-DO system. IS-856 is described in detail in the document 3GPP2 C.S0024, entitled "cdma2000 High Rate Packet Data Air Interface Specification," which is publicly available and incorporated herein by reference.

Figure 1:
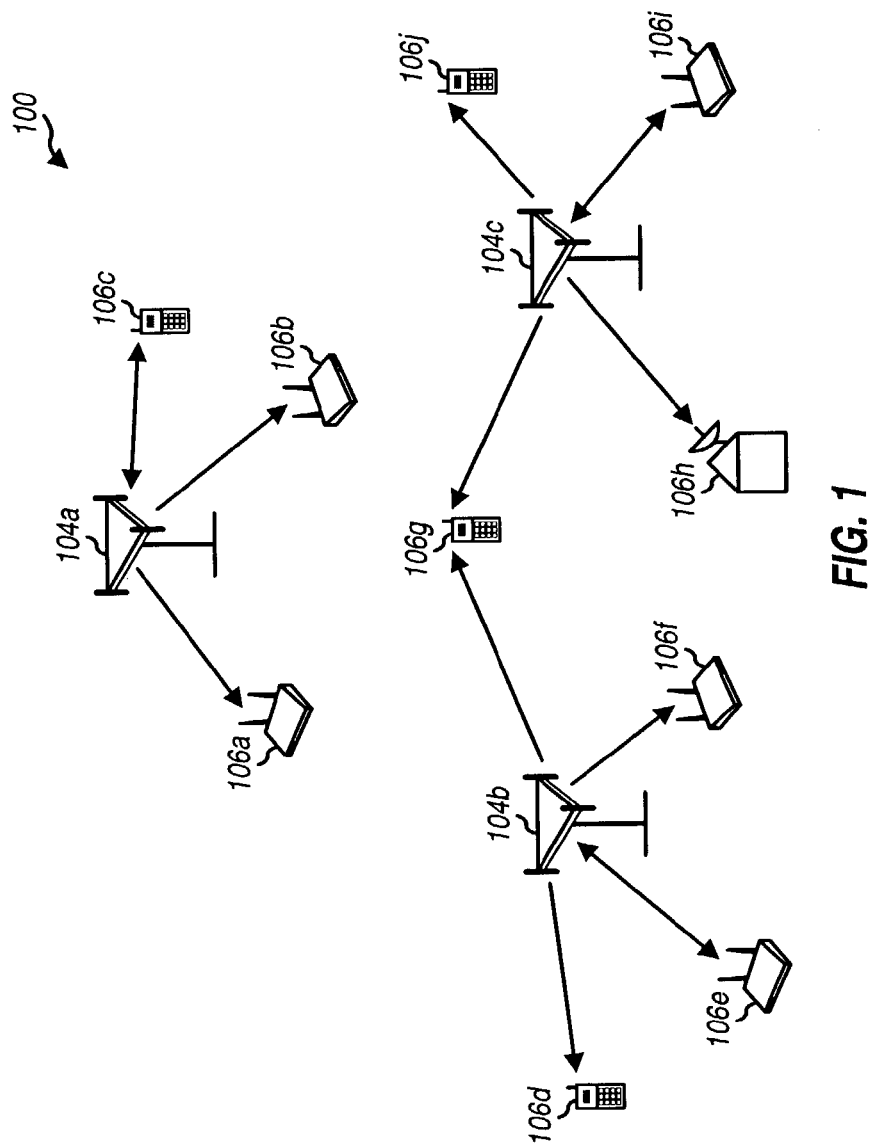
FIG. 1 illustrates an HDR system.

FIG. 1 is a diagram of an HDR system 100. (A network typically refers to a deployment of a system. However, the terms "network" and "system" are often used interchangeably in the art.) HDR system 100 includes a number of access points 104 that communicate with a number of terminals 106. An access point is a fixed station used for communicating with the terminals and may also be referred to as a base station, a base transceiver system (BTS), a Node B, or some other terminology. A terminal may also be referred to as a mobile station, a remote station, an access terminal, a user terminal, a wireless communication device (WCD), a handset, a user equipment (UE), or some other terminology. For HDR, each terminal may communicate with one access point on the forward link (or downlink) and one or more access points on the reverse link (or uplink) at any given moment.

A system controller (not shown in FIG. 1) typically couples to the access points and may further couple to other networks such as a public switched telephone network (PSTN) and/or a packet data network (PDN). The system controller provides coordination and control for the access points coupled to it. Via the access points, the system controller may control the routing of data among the terminals and between the terminals and other entities coupled to the other networks.

For HDR, a "session" refers to a shared state between a terminal and an access point. This shared state stores the protocols and protocol configurations that have been negotiated and are used for communication between the terminal and the access point. A terminal may open a session by performing initialization procedures with the access point and may close the session by performing termination procedures. A terminal with an opened session is referred to herein as an "active" terminal. A "connection" refers to a particular state of the air-link in which the terminal is assigned traffic channels on the forward and reverse links. During a single session, the terminal and access point can open and close the connection multiple times. The terminal may open and close the connection by exchanging messages with the access point. A terminal with an opened connection is referred to herein as a "connected" terminal.

In the HDR system, on the downlink, an access point transmits data to only one connected terminal at any given moment. On the uplink, multiple connected terminals may transmit data simultaneously to the access point. In FIG. 1, a two-ended arrow indicates communication between a connected terminal and an access point, and a single-ended arrow indicates communication between an active terminal without an opened connection and an access point. Active terminals that do not have opened connections may nevertheless receive messages from the access points on the downlink, as described below.

Figure 2A:
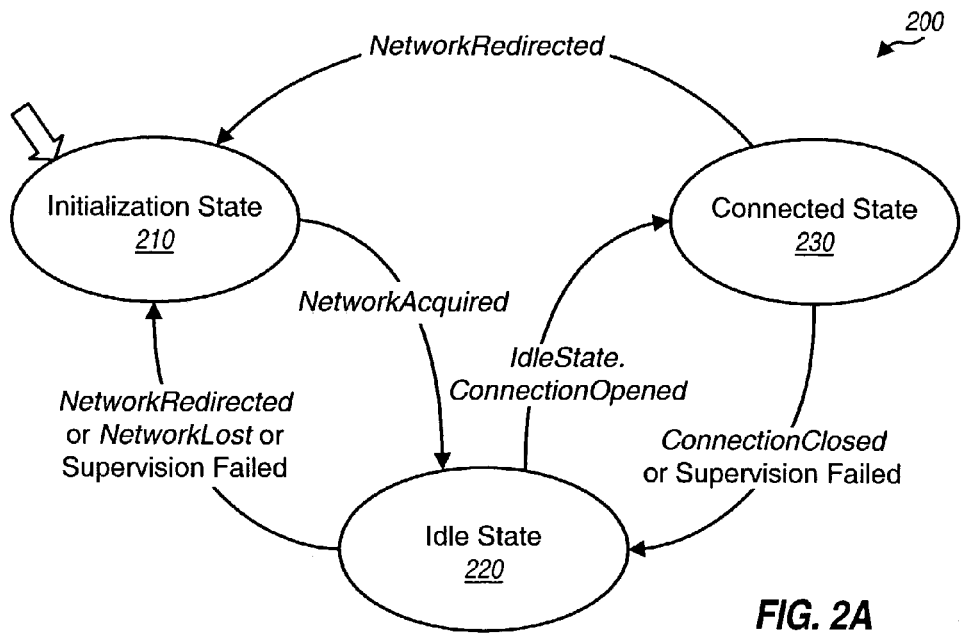
FIGS. 2A and 2B show state diagrams for a terminal in the HDR system.

FIG. 2A shows a state diagram 200 for a terminal in the HDR system. This state diagram includes three states—an Initialization state 210, an Idle state 220, and a Connected state 230. The terminal acquires the system in Initialization state 210, opens a session, and transitions to Idle state 220. While in Idle state 220, the terminal has an opened session with the system, but the connection for the terminal is closed. The terminal continues to maintain the link with the system while in Idle state 220. To transmit and/or receive data, the terminal transitions to Connected state 230 whereby the connection is opened.

Figure 2B:
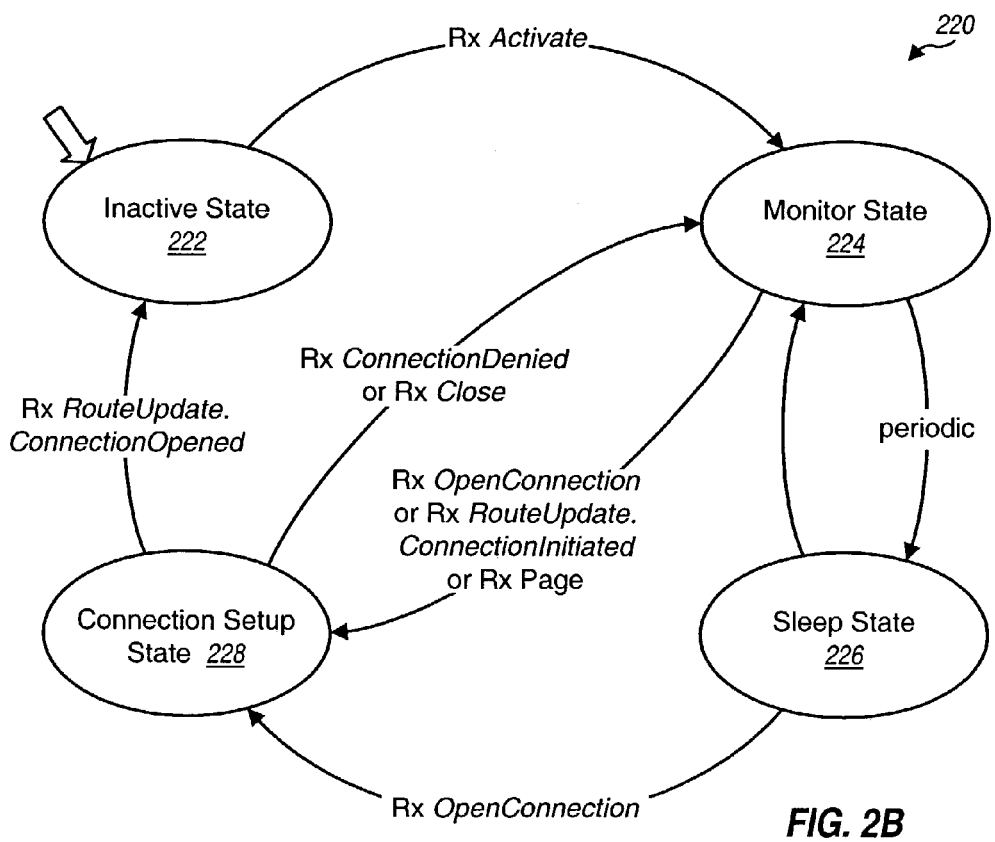

FIG. 2B shows a state diagram for Idle state 220, which includes four states an Inactive state 222, a Monitor state 224, a Sleep state 226, and a Connection Setup state 228. In Inactive state 222, the terminal waits for an Activate command, and would then transition to Monitor state 224 upon receiving this command.

In Monitor state 224, the terminal monitors a Control Channel to receive messages sent on this channel. The terminal also updates its system overhead information, if necessary, based on the received messages. The access point may transmit unicast packets to the terminal in this state. A unicast packet is a packet that is transmitted point-to-point to a specific terminal, as compared to multicast and broadcast packets which are transmitted point-to-multipoint to multiple terminals. While in Monitor state 224, the terminal would transition to Connection Setup state 228 if it receives a page message to set up a connection or if it needs to open the connection. The terminal may transition to Sleep state 226 if it determines that its system overhead information is current and that no other processing needs to be performed.

In Sleep state 226, the terminal does not monitor the Control Channel and the access point does not transmit unicast packets to it. The terminal may shut down as much circuitry as possible to conserve power while in Sleep state 226. The terminal may also transition to Connection Setup state 228 to set up a connection if it requires one.

The state diagrams in FIGS. 2A and 2B and the transitions between the various states are described in detail in the aforementioned 3GPP2 C.S0024 document.

In the HDR system, messages are sent on the Control Channel in Control Channel cycles that are sequentially numbered starting at the beginning of system time (which is specifically defined for the HDR system). In the Idle state, the access point and the terminal would transition from the Sleep state to the Monitor state in time to respectively send and receive messages on designated Control Channel cycles. In particular, messages for the terminal, if any, are sent in each Control Channel cycle C that satisfies the following condition:

$$(C+R) \bmod N_{IDPSleep} = 0, \quad \text{Eq(1)}$$

where C is the number of Control Channel cycles since the beginning of system time, R is a value that may be different from terminal to terminal, and $N_{IDPSleep}$ is a protocol numeric constant defined by IS-856.

The number of Control Channel cycles that constitutes a sleep period for the terminal in the HDR system is thus determined by the protocol numeric constant $N_{IDPSleep}$, which is specified to be equal to 5.12 seconds by IS-856. The specific Control Channel cycles on which messages are sent for each terminal may be different from terminal to terminal because different values of R may be assigned to the terminals.

FIG. 3A shows a timing diagram for operation in the Monitor and Sleep states by a terminal in the HDR system. In this timing diagram, the terminal periodically transitions from the Sleep state to the Monitor state to monitor the Control Channel and perform other functions to maintain the link while it is in the Idle state. The slot "on" time denotes the time period when the terminal is in the Monitor state, and the sleep time denotes the time period when the terminal is in the Sleep state. A "paging slot" refers to the time period in which messages may be sent for the terminal while it is in the Idle state. The slot "on" time typically spans the paging slot plus any necessary setup and warm-up times for the circuitry within the terminal. A "paging slot cycle" refers to the time span between a pair of successive designated paging slots. For the HDR system, the paging slot cycle is determined by the protocol numeric constant NIDPSleep and is defined to be equal to 5.12 seconds.

In the HDR system, a terminal detects and processes the signals transmitted by the system and may proceed to perform certain functions (e.g., for initialization, to open a session, and so on). If the terminal has data to transmit or receive, it then opens the connection with the system and enters the Connected state (as shown in FIG. 2A). Otherwise, the terminal enters the Idle state whereby it monitors the signals from the system in order to maintain the link and to receive any message intended for it. For the HDR system, messages for the terminal are sent in designated paging slots that are spaced apart by 5.12 seconds while it is in the Idle state. The monitoring of the signals from the system while in the Idle state allows the terminal to receive updates for system overhead information and other message sent for it. The terminal normally performs the monitoring even when the link is not changing (and thus the system overhead information does not need updating) and even if no data traffic is forthcoming. In these instances, battery power is unnecessarily consumed by monitoring the signals from the system.

The HDR system supports packet data application, which is typically characterized by bursty data transmissions. Thus, the terminal is sporadically active for only some of the time and idle for most of the time. A data session may be opened for the terminal for an extended period of time. The terminal may then transition between the Idle and Connected states as needed to exchange data with the system. Since packet data communication is bursty in nature, the terminal may spend extended periods of time in the Idle state with only sporadic and relatively short stays in the Connected state.

Techniques are provided herein for performing timer-based sleep to extend sleep time and thus battery life for terminals in wireless communication systems, such as the HDR system. It is recognized that the likelihood of data traffic (i.e., transmission and/or reception of data) for a terminal for some applications (e.g., packet data) is related to recent usage. In particular, most data exchanges in a data session are not expected to have lengthy intervals of no data traffic, and the probability of data traffic is considered to have a relationship to recent data traffic. Thus, if the recent usage indicates that data traffic is unlikely, then the terminal can continue to maintain the link but can monitor the signals from the system at a reduced rate.

Figure 4:
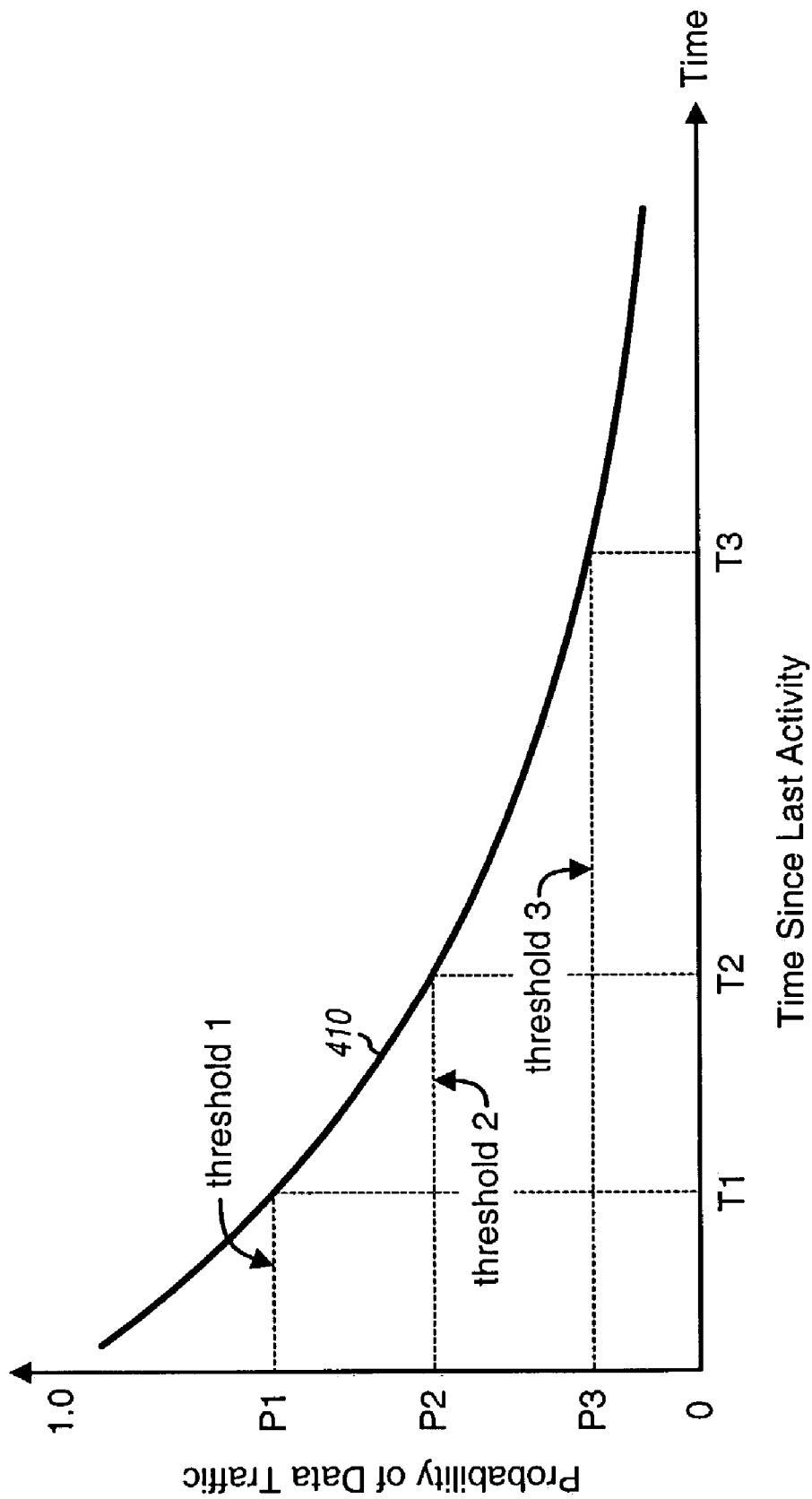
FIG. 4 shows an example plot of probability of data traffic versus time since last activity.

FIG. 4 shows an example plot 410 of probability of data traffic for a terminal versus time since last activity. The time since last activity is represented on the x-axis and may be given in units of second. The probability of data traffic is represented on the y-axis and ranges from 0 to 1. An activity may relate to an exchange of data between the terminal and the system, or some other event.

Plot 410 indicates that, in general, the probability of data traffic is inversely related to the time since last activity. Plot 410 may approximate a logarithm function (as shown in FIG. 4) or some other function, depending on various factors. Plot 410 may be characterized (1) by observing the activities of a number of terminals in the system, (2) based on usage modeling, (3) based on scheduled data traffic, or (4) by some other means.

In an embodiment, the sleep time for the terminal is determined by a timer that may be set to one of multiple possible values or time thresholds. Each timer value corresponds to a specific duration of time for a sleep by the terminal.

In an embodiment, the timer is enabled for use based on session information for the terminal. For the HDR system, the timer may be enabled if the terminal has an opened session but a closed connection (i.e., the timer may be enabled if the terminal is in the Idle state). If enabled, the timer is loaded with a particular value prior to entering sleep. The duration of the sleep is then determined by the value loaded into the timer.

The specific value to be loaded into the timer may be determined by various factors such as the probability of data traffic, other pertinent events, and so on. In one specific embodiment that is described in detail below, an initial timer value is first determined based on an estimated probability of data traffic for the terminal. This initial timer value may then be modified by pertinent events to obtain a final timer value. The final value is then loaded into the timer.

The initial timer value is determined based on the probability of data traffic for the terminal, which may be estimated based on a particular function such as the one shown in FIG. 4. A set of probability threshold values may be defined for the probability of data traffic, as shown in FIG. 4. This set of probability threshold values may be mapped to a corresponding set of inactivity time threshold values for the time since last activity, as also shown in FIG. 4. The set of probability threshold values may also be mapped to a corresponding set of timer values. The specific initial timer value to use may then be dependent on the time since last activity, as quantized by these sets of threshold values.

For example, probability threshold values of P1, P2, and P3 may be defined as shown in FIG. 4 and may be mapped to inactivity time threshold values of T1, T2, and T3, respectively. The probability threshold values of P1, P2, and P3 may also be mapped to timer values of S1, S2, and S3, respectively. If the time since last activity is greater than T3, then the probability of data traffic is less than P3, in which case the initial timer value is S3. If the time since last activity is between T2 and T3, then the probability of data traffic is between P2 and P3, in which case the initial timer value is S2. If the time since last activity is between T1 and T2, then the probability of data traffic is between P1 and P2, in which case the initial timer value is S1. And if the time since last activity is less than T1, then the probability of data traffic is greater than P1, in which case the initial timer value is S0. Each of the timer values, S0, S1, S2, and S3, may be selected to be an integer multiple of the paging slot cycle (i.e., an integer multiple of 5.12 seconds for the HDR system), where the integer may be zero or greater (e.g., S0=5.12 seconds).

In general, any number of probability threshold values (e.g., 1, 2, and so on) may be used. More probability threshold values may better match the probability of data traffic. A timer may be used to indicate these thresholds.

For clarity, a specific implementation has been described above whereby the probability of data traffic for the terminal is estimated based solely on the time since last activity, and the initial timer value is dependent on the estimated probability of data traffic. In general, the probability of data traffic may be estimated based on various factors (e.g., user activities/inputs).

The plot shown in FIG. 4 is an example plot based on a specific usage model. Other plots with different shapes may also be used, and this is within the scope of the invention. For example, the probability of data traffic may start to curve up after a particular amount of time since last activity (instead of asymptotically approaching zero as shown in FIG. 4). This upturn characteristic may reflect the fact that the terminal may become overdue for data traffic after an extended period of inactivity.

The value to be loaded into the timer may be limited to a particular maximum value, which may be selected such that acceptable performance can be achieved. The maximum timer value dictates the minimum rate for monitoring the signals from the system. This minimum rate may be selected such that the terminal can properly react to expected changes in the system, achieve the desired hand-off performance, and so on. As a specific example, the maximum timer value may be selected to be 40.96 seconds (or 8 paging slot cycles) for the HDR system.

The timer value may be determined initially based on the probability of data traffic for the terminal, as described above. This initial timer value may be modified to account for pertinent events, which may relate to link maintenance, user inputs, and so on.

Link maintenance events may include (1) synchronization with system time, (2) registration and/or authentication with the system, (3) monitoring messages from the system for updated system overhead information, (4) hand-off from one access point to another access point, (5) hand-off from one system to another system, (6) hand-off from one subnet (or access point) to another subnet, and (6) possibly others. The rate at which timing synchronization needs to be performed may be dependent on the stability of the terminal's time hypothesis. If the sleep is too long, then the terminal's internal clock may drift too much. In that case, the terminal's timing may be sufficiently skewed such that it cannot efficiently perform the required signal processing when it wakes up from a sleep. Operation in a second system or mode (e.g., IS-2000) may improve the time hypothesis. The rates at which registration, system overhead information updating, and hand-off need to be performed may be dependent on various factors such as network topology.

In certain instances, actions needed to be performed by the terminal for link maintenance may dictate that the terminal remains awake regardless of the initial timer value. In this case, the initial timer value may be modified accordingly. Events requiring the terminal to monitor the Control Channel for system overhead information may be considered as being equivalent to data traffic and can also result in the modification of the initial timer value. For example, in the HDR system, the terminal can monitor a quick configuration message sent on the Control Channel. A mismatch between the information in this message- and the information stored by the terminal would indicate that the system overhead information has changed. In this case, the terminal would need to acquire the updated system overhead information and the sleep time may be modified accordingly. The final timer value may thus be set equal to zero to prevent the terminal from entering sleep, to 5.12 seconds to force the terminal to wake up for the next designated paging slot, to the initial timer value, or to some other value.

The initial timer value may also be modified due to user inputs. For example, recent reception of a user input may be considered as a pertinent event in determining the final timer value. The initial timer value may also be modified for some other types of event, such as a user-specified alarm clock, and this is within the scope of the invention. Implementation of an alarm clock by a terminal is described in U.S. Pat. No. 6,453, 182, entitled "Wireless Telephone Airplane and Alarm Clock Modes," issued Sep. 17, 2002.

If the final timer value (i.e., the value that is actually loaded into the timer) is greater than the time until the next paging slot, then the terminal can "sleep through" one or more designated paging slots and extend the sleep time. This would then reduce power consumption and improve the standby time for the terminal. However, the terminal can remain awake if required for link maintenance, regardless of the initial timer value. Events requiring the terminal to monitor each designated paging slot can also prevent sleep through. Multiple timer values may be defined for possible selection, as described above, so that the length of the sleep through is variable and selectable.

In general, the final timer value may be determined by the initial timer value and any modifications required by pertinent events for the terminal. It is desirable to not sleep during data traffic, since data would be lost if such were to occur. It is also desirable to not sleep when link maintenance is required, since the link may be lost in that case. Thus, the final timer value is selected so that the link can be maintained and acceptable data traffic monitoring can be achieved. That is, the sleep time is selected such that undesirable sleep through of data traffic and/or required link maintenance events is limited to within an acceptable level.

Figure 5:
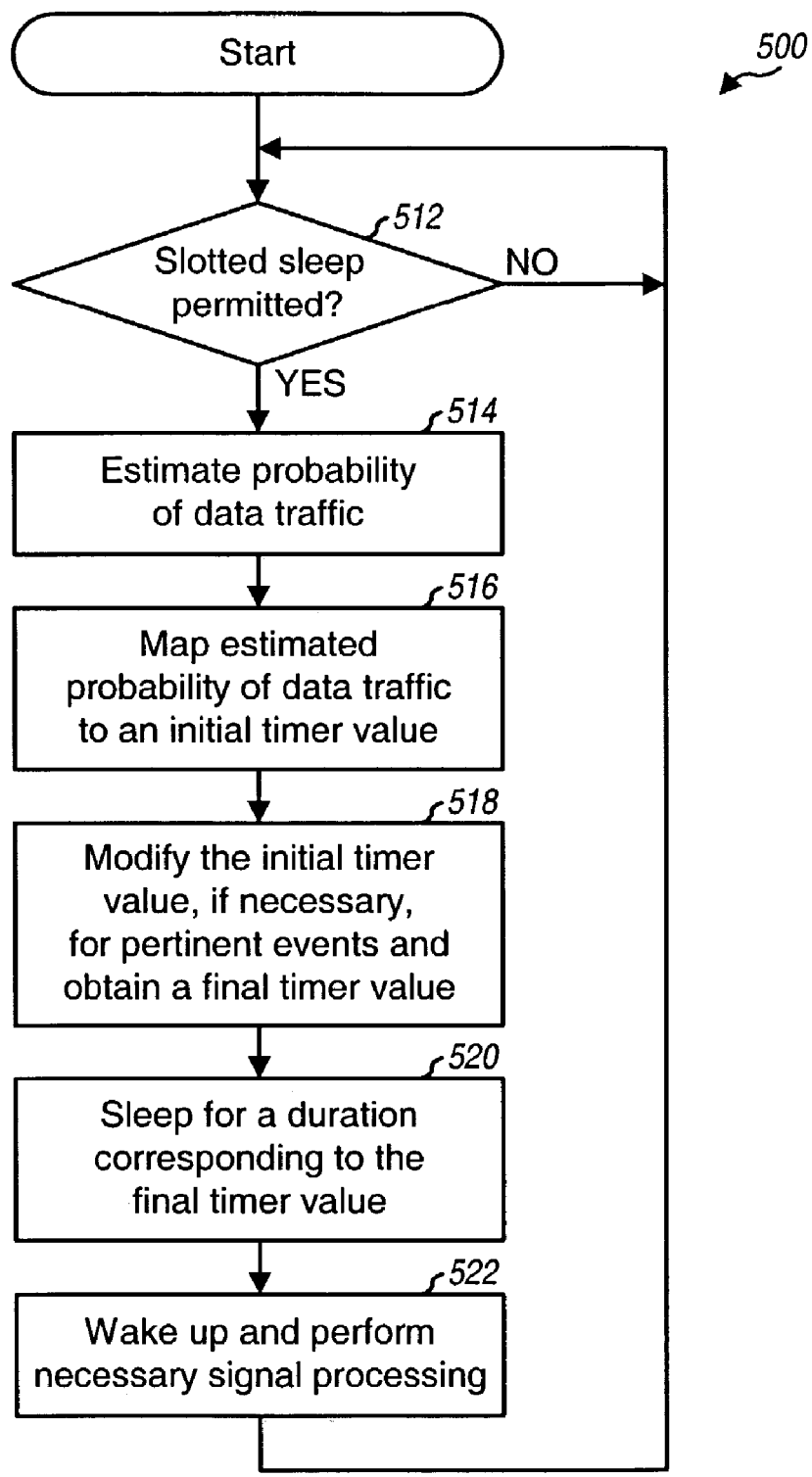
FIG. 5 shows a flow diagram of a process for performing timer-based sleep by the terminal.

FIG. 5 shows a flow diagram of an embodiment of a process 500 for performing timer-based sleep by a terminal. Initially, a determination is made whether or not slotted sleep is permitted for the terminal (step 512). This determination may be made based on session information for the terminal. For the HDR system, slotted sleep may be permitted, for example, while the terminal is in the Idle state whereby a session is opened but a connection is not opened. If slotted sleep is not permitted, then the process returns to step 512.

Otherwise, if slotted sleep is permitted, then the probability of data traffic for the terminal is estimated (step 514). As described above, the probability of data traffic may be estimated based on (1) the time since last activity and (2) a particular function defining probability of data traffic versus time since last activity. The time since last activity may be set equal to the time since the terminal enters the Idle state.

The estimated probability of data traffic is then mapped to an initial timer value (step 516). As noted above, a set of probability threshold values may be used and mapped to a set of timer values. The initial timer value would then be the timer value associated with the probability threshold value to which the estimated probability of data traffic is mapped.

The initial timer value may be modified due to one or a combination of pertinent events (e.g., required for link maintenance), as described above (step 518). The result of step 518 is a final timer value indicative of the duration of the next sleep by the terminal. This final timer value may be equal to zero (to indicate no sleep), the time until the next paging slot (to indicate a "normal" sleep), or multiple paging slot cycles (to indicate an extended sleep, i.e., a sleep through of one or more designated paging slots). The final value is loaded into the timer that is used to keep track of the duration of time to sleep.

The terminal then performs a sleep for the duration of time corresponding to the final value loaded into the timer (step 520). Upon expiration of the timer, the terminal wakes up and performs the necessary signal processing (522). For example, the terminal can process the signals from the system, update its system overhead information, synchronize its timing, and so on. Thereafter, the process returns to step 512. Process 500 may be terminated by an occurrence of any one of a number of specified events (e.g., a request to open the connection).

For clarity, a 2-step process has been described above whereby the sleep time for the terminal is initially determined based on the estimated probability of data traffic (in the first step) and thereafter modified based on pertinent events (in the second step). Other processes may also be used to obtain the sleep time for the terminal (i.e., the final timer value), and this is within the scope of the invention. For example, a 1-step process may be implemented whereby all criteria are considered simultaneously in determining the final timer value (i.e., the sleep time) for the terminal.

FIG. 3B shows a timing diagram for operation in the Monitor and Sleep states by a terminal in the HDR system with extended timer-based sleep. In this timing diagram, the terminal periodically transitions from the Sleep state to the Monitor state to monitor the signals from the system and to perform other necessary functions. The amount of time to sleep may be determined by the final timer value, as described above. A normal sleep occurs if the final timer value is equal to the time until the next paging slot, in which case the terminal wakes up prior to its next designated paging slot. An extended sleep occurs if the final timer value exceeds one paging slot cycle, in which case the terminal sleeps through one or more designated paging slots and wakes up prior to the next designated paging slot following the sleep.

The techniques described herein for performing timer-based sleep may also be used with multiple communication systems. For example, a dual-mode terminal may be in communication with a first CDMA system for one service (e.g., voice and lower-rate data) and with a second CDMA 1xEV-DO system for another service (e.g., packet data). In this example, a CDMA 1x system is a CDMA system that implements IS-2000 or IS-95. The terminal may be in the idle state for both systems and may need to monitor the designated paging slots for both systems. For the CDMA 1x system, the paging slot cycle may be negotiated between the terminal and that system. The terminal may then wake up prior to each designated paging slot for the CDMA 1x system. For the CDMA 1xEV-DO system, the paging slot cycle is fixed at 5.12 seconds. However, the terminal may sleep through some paging slots for the CDMA 1xEV-DO system if the probability of data traffic is sufficiently low and no other actions need to be performed for link maintenance.

Figure 6:
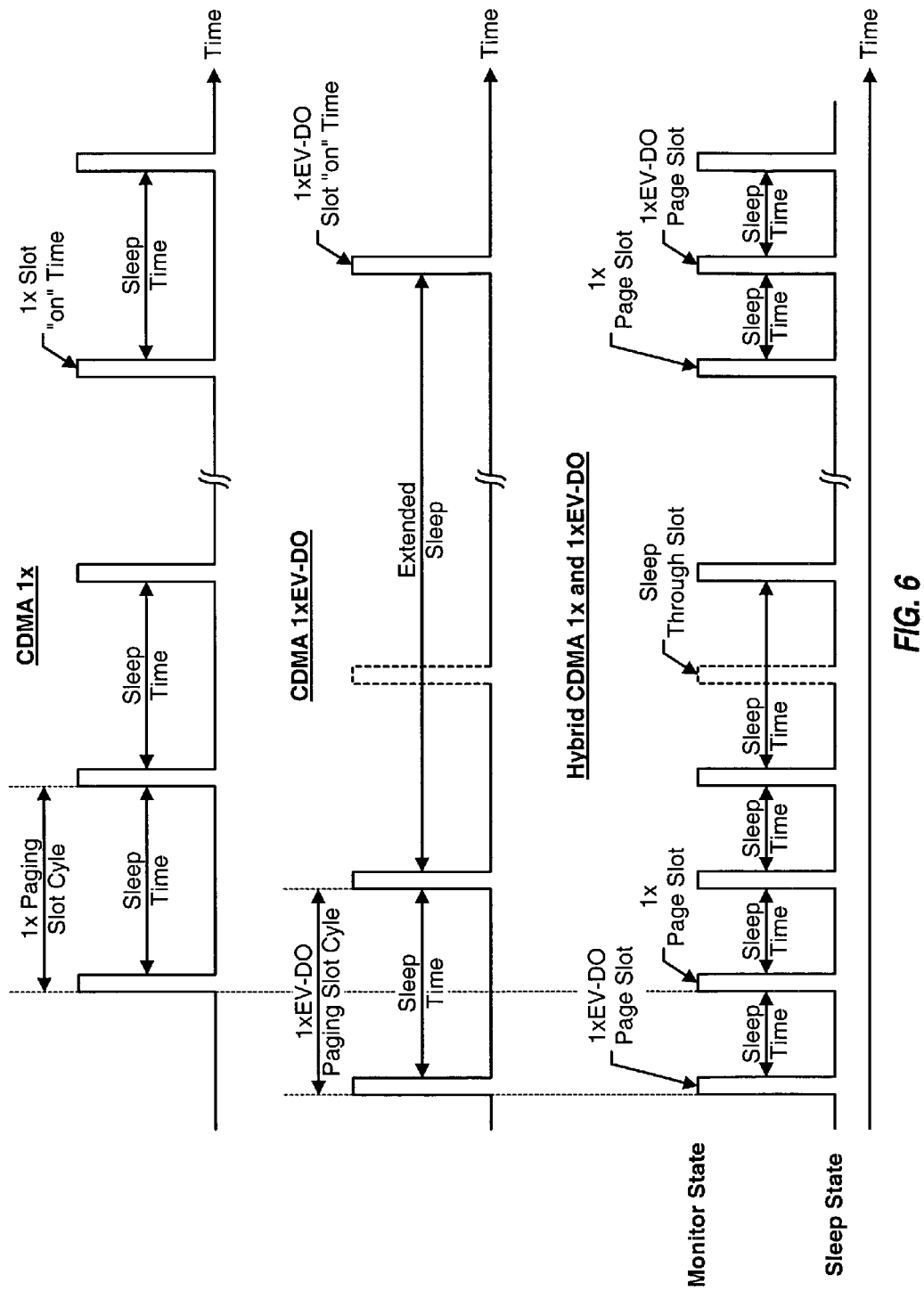
FIG. 6 shows a timing diagram for operation by a dual-mode terminal with interlaced paging slots for two systems.

FIG. 6 shows a timing diagram for operation by a dual-mode terminal with interlaced paging slots for two systems. The two systems may be the CDMA 1x and CDMA 1xEV-DO systems. The designated paging slots for the terminal for the CDMA 1x system are shown at the top of FIG. 6, and the designated paging slots for the terminal for the CDMA 1xEV-DO system are shown in the middle of FIG. 6. The 1x paging slot cycle may be equal to, or different from (as shown in FIG. 6), the 1xEV-DO paging slot cycle.

For dual-mode 1x and 1xEV-DO operation, the terminal would wake up for all designated paging slots for the CDMA 1x system (e.g., to process a quick paging channel in the CDMA 1x system). The terminal would also wake up for some or all of the designated paging slots for the CDMA 1xEV-DO system, depending on whether or not extended sleep is permitted to sleep through some 1xEV-DO paging slots. The terminal may remain awake if the sleep time between successive paging slots that need to be processed is shorter than a particular time threshold.

Figure 7:
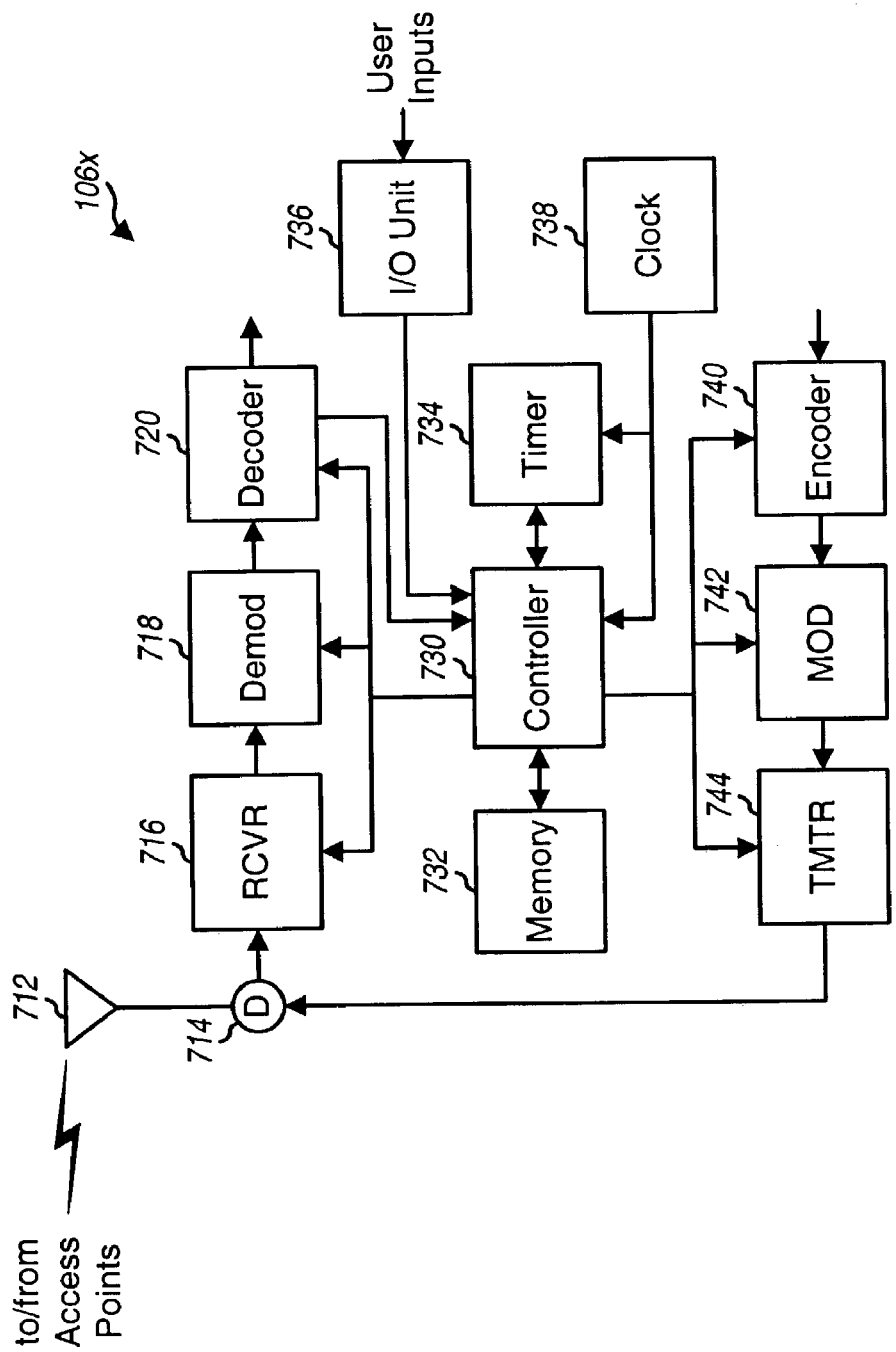
FIG. 7 is a block diagram for a specific design of the terminal.

FIG. 7 is a block diagram of an embodiment of a terminal 106x capable of performing timer-based sleep. One or more forward link signals from one or more access points are received by an antenna 712, routed through a duplexer 714, and provided to a receiver unit (RCVR) 716. Receiver unit 716 conditions (e.g., filters, amplifies, and frequency downconverts) the received signal and further digitizes the conditioned signal to provide data samples. A demodulator (Demod) 718 further processes (e.g., despreads, channelizes, and data demodulates) the data samples to provide demodulated data. A decoder 720 then deinterleaves and decodes the demodulated data to provide decoded data.

On the reverse link, data to be transmitted is processed (e.g., formatted and coded) by an encoder 740, further processed (e.g., channelized, symbol mapped, and spectrally spread) by a modulator 742, and conditioned (e.g., amplified, filtered, and frequency upconverted) by a transmitter unit (TMTR) 744 to generate a reverse link signal. The reverse link signal is then routed through duplexer 714 and transmitted via antenna 712 to one or more access points.

A controller 730 directs the operation of various processing units within the terminal. Controller 730 may receive various inputs such as an indication of forward link traffic data from decoder 720, user inputs from an input/output (I/O) unit 736, and a clock signal from a clock unit 738.

If the terminal is in the idle state and slotted sleep is permitted, then controller 730 may perform various tasks for sleep. Controller 730 may determine the value to load into a timer 734 for the next sleep, based on the various inputs and data stored in a memory unit 732 (e.g., usage model data). Controller 730 may also initiate sleep by sending control signals to shut down as much circuitry as possible on the transmit and receive paths and starting timer 734. Timer 734 would then count down from the loaded value using a clock signal provided by clock unit 738. When timer 734 counts down to zero (i.e., upon expiration of the timer), it provides an indication to controller 730. Controller 730 would then provide control signals to power on the necessary circuitry in the receive path to enable reception and processing of the forward link signal. Controller 730 may also provide control signals to power on circuitry in the transmit path, if necessary.

The techniques described herein for performing timer-based sleep may be implemented by various means. For example, these techniques may be implemented in hardware, software, or a combination thereof. For a hardware implementation, the elements used to perform timer-based sleep (e.g., controller 730 and timer 734) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, certain portions of the timer-based sleep (e.g., the determination of the value to load into the timer) may be implemented with modules (e.g., procedures, functions, and so on) that perform the functions described herein. The software codes may be stored in a memory unit (e.g., memory unit 732 in FIG. 7) and executed by a processor (e.g., controller 730). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for performing sleep for a terminal in a wireless communication system, comprising:
   estimating, within the terminal, a probability of data traffic in a designated paging slot for the terminal, the probability being estimated based on a time since last activity for the terminal;
   determining a timer value based on the estimated probability of data traffic; and
   performing a sleep for a duration of time corresponding to the timer value.

2. The method of claim 1, wherein the probability of data traffic is estimated based on a particular usage model.

3. The method of claim 1, wherein the determining includes
   mapping the estimated probability of data traffic to one of a plurality of probability threshold values, wherein each of the plurality of probability threshold values is associated with a respective one of a plurality of timer values, and
   identifying the timer value as the one associated with the probability threshold value to which the estimated probability of data traffic is mapped.

4. The method of claim 1, wherein the timer value is inversely related to the estimated probability of data traffic.

5. The method of claim 1, wherein the timer value is limited to a particular maximum value.

6. The method of claim 1, wherein the communication system supports an idle state, and wherein messages for the terminal are sent in designated slots at fixed intervals while the terminal is in the idle state.

7. The method of claim 6, wherein the duration of the sleep extends past at least one designated slot.

8. The method of claim 1, further comprising:
   modifying the timer value based on an event, and wherein the sleep is performed for a duration of time corresponding to the modified timer value.

9. The method of claim 8, wherein the event relates to link maintenance.

10. The method of claim 8, wherein the event relates to monitoring for updated system information.

11. The method of claim 8, wherein the event relates to hand-off of the terminal from a first access point to a second access point.

12. The method of claim 8, wherein the event relates to a user input.

13. The method of claim 8, wherein the event relates to an alarm clock implemented by the terminal.

14. The method of claim 1, further comprising:
   ascertaining whether or not slotted sleep is permitted; and
   performing the estimating, determining, and performing the sleep if slotted sleep is permitted.

15. The method of claim 14, wherein whether or not slotted sleep is permitted is ascertained based on session information.

16. The method of claim 1, wherein the wireless communication system implements IS-856.

17. The method of claim 16, wherein the wireless communication system further implements IS-2000, or IS-95, or both IS-2000 and IS-95.

18. The method of claim 1, further comprising:
   estimating, within the terminal, a distinct probability of data traffic in a designated paging slot of a distinct wireless communication system for the terminal; and
   determining a modified timer value based on the estimated probability of data traffic and the estimated probability of data traffic in the distinct wireless communication system.

19. A method for performing sleep for a terminal in a CDMA communication system that supports an idle state, wherein messages for the terminal are sent in designated slots at fixed intervals while the terminal is in the idle state, the method comprising:
   estimating, within the terminal, a probability of data traffic for the terminal, based on a time since last activity for the terminal;
   mapping the estimated probability of data traffic to one of a plurality of probability threshold values, wherein each of the plurality of probability threshold values is associated with a respective one of a plurality of timer values;
   identifying a timer value associated with the probability threshold value to which the estimated probability of data traffic is mapped; and
   performing a sleep for a duration of time corresponding to the timer value, wherein the duration of the sleep extends past at least one designated slot.

20. An apparatus in a wireless communication system, comprising:
   means for estimating, within a terminal, a probability of data traffic in a designated paging slot for the terminal, the probability being estimated based on a time since last activity for the terminal;
   means for determining a timer value based on the estimated probability of data traffic; and
   means for performing a sleep for a duration of time corresponding to the timer value.

21. The apparatus of claim 20, comprising:
   means for modifying the timer value based on an event, and wherein the sleep is performed for a duration of time corresponding to the modified timer value.

22. A terminal in a wireless communication system, comprising:
   a controller within the terminal operative to estimate a probability, based on a time since last activity for the terminal, of data traffic for the terminal, determine a timer value based on the estimated probability of data traffic, and initiate a sleep for a duration of time corresponding to the timer value; and
   a timer operative to receive the timer value and count the duration of time indicated by the timer value, and wherein the duration of time may exceed a designated slot interval based on the estimated probability of data traffic.

23. The terminal of claim 22, wherein a plurality of probability threshold values are associated with a plurality of timer values, and wherein the controller is further operative to map the estimated probability of data traffic to one of the plurality of probability threshold values and to identify the timer value as the one associated with the probability threshold value to which the estimated probability of data traffic is mapped.

24. The terminal of claim 22, wherein the wireless communication system implements IS-856.

25. The method of claim 24, wherein the wireless communication system further implements IS-2000, or IS-95, or both IS-2000 and IS-95.

26. A method of performing sleep for a terminal, the method comprising:

determining an idle state in each of a plurality of distinct wireless communication systems, each of the plurality of distinct wireless communication systems supporting slotted paging;

estimating, within the terminal, a probability of data traffic for the terminal in each of the plurality of distinct wireless communication systems, the probability being estimated based on a time since last activity tor the terminal;

determining a timer value based on the estimated probability of data traffic in each of the plurality of distinct wireless communication systems; and performing a sleep for a duration of time corresponding to the timer value.

27. The method of claim 26, wherein at least one of the plurality of distinct wireless communication systems comprises a wireless system having designated paging slots at fixed intervals.

28. The method of claim 26, wherein each of the plurality of distinct wireless communication systems supports a distinct paging slot interval.

29. The method of claim 26, wherein the duration of the sleep extends past at least one designated slot of a first of the plurality of distinct wireless communication systems.

* * * * *

UNITED STATES PATENT AND TRADEMARK OFFICE
CERTIFICATE OF CORRECTION

| | |
|---|---|
| PATENT NO. | : 7,689,196 B2 |
| APPLICATION NO. | : 10/351126 |
| DATED | : March 30, 2010 |
| INVENTOR(S) | : Hutchison et al. |

It is certified that error appears in the above-identified patent and that said Letters Patent is hereby corrected as shown below:

Title page, Item (12) and Item (75), line 4, inventor's Name: "James A. Hutchinson" to read as --James A. Hutchison--

Column 14, line 4, claim 26: "activity tor" to read as --activity for--

Signed and Sealed this
Fourteenth Day of June, 2011

David J. Kappos
*Director of the United States Patent and Trademark Office*